United States Patent
Smith et al.

(10) Patent No.: US 6,648,552 B1
(45) Date of Patent: *Nov. 18, 2003

(54) SENSOR SYSTEM FOR BURIED WASTE CONTAINMENT SITES

(75) Inventors: Ann Marie Smith, Pocatello, ID (US); Bradley M. Gardner, Idaho Falls, ID (US); Kevin M. Kostelnik, Idaho Falls, ID (US); Judy K. Partin, Idaho Falls, ID (US); Gregory D. Lancaster, Idaho Falls, ID (US); Mary Catherine Pfeifer, San Antonio, NM (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/418,681

(22) Filed: Oct. 14, 1999

(51) Int. Cl.⁷ ................................. G21F 9/00
(52) U.S. Cl. ................... 405/129.55; 405/129.5
(58) Field of Search ................... 588/259, 260; 405/128, 129, 54, 129.45; 73/40.7, 49.2 T, 763, 768, 773, 786, 789, 788, 794, 800, 811

(56) References Cited

U.S. PATENT DOCUMENTS

| | | | | |
|---|---|---|---|---|
| 4,404,516 A | * | 9/1983 | Johnson, Jr. ................ 324/54 |
| 4,654,165 A | * | 3/1987 | Eisenberg ................ 252/408.1 |
| 4,753,551 A | * | 6/1988 | Brueggemann et al. ..... 405/128 |
| 5,362,182 A | * | 11/1994 | Hergenrother ............. 405/129 |
| 5,403,125 A | * | 4/1995 | Andersen ................... 405/267 |
| 5,445,795 A | * | 8/1995 | Lancaster et al. ............ 422/86 |
| 5,496,733 A | * | 3/1996 | Spandau et al. ............. 436/89 |
| 5,543,719 A | * | 8/1996 | Lomasney ................. 324/557 |
| 5,581,019 A | * | 12/1996 | Minor et al. ................ 73/115 |
| 5,614,893 A | * | 3/1997 | Ahmad et al. ......... 340/870.16 |
| 5,663,490 A | * | 9/1997 | Kozen ........................ 73/49.2 |
| 5,773,713 A | * | 6/1998 | Barber et al. .............. 73/61.41 |
| 5,788,422 A | * | 8/1998 | Gardner et al. ............. 405/267 |
| 5,791,825 A | * | 8/1998 | Gardner et al. ............. 405/267 |
| 5,793,046 A | * | 8/1998 | Jeffers et al. ............... 250/364 |
| 5,880,475 A | * | 3/1999 | Oka et al. ................ 250/483.1 |
| RE36,201 E | * | 4/1999 | Miller ................... 250/390.04 |
| 5,905,184 A | * | 5/1999 | Carter, Jr. ................... 588/260 |
| 5,961,437 A | * | 10/1999 | Smith et al. ................. 588/249 |
| 6,016,714 A | * | 1/2000 | Smith et al. ............... 73/866.5 |
| 6,035,701 A | * | 3/2000 | Lowry et al. ................ 73/40.7 |
| 6,069,935 A | * | 5/2000 | Schick et al. ............. 378/98.8 |
| 6,183,663 B1 | * | 2/2001 | Kalley et al. ................. 252/68 |

\* cited by examiner

*Primary Examiner*—Thomas B. Will
*Assistant Examiner*—Raymond Addie
(74) *Attorney, Agent, or Firm*—Trask Britt PC

(57) ABSTRACT

A sensor system for a buried waste containment site having a bottom wall barrier and sidewall barriers, for containing hazardous waste. The sensor system includes one or more sensor devices disposed in one or more of the barriers for detecting a physical parameter either of the barrier itself or of the physical condition of the surrounding soils and buried waste, and for producing a signal representing the physical parameter detected. Also included is a signal processor for receiving signals produced by the sensor device and for developing information identifying the physical parameter detected, either for sounding an alarm, displaying a graphic representation of a physical parameter detected on a viewing screen and/or a hard copy printout. The sensor devices may be deployed in or adjacent the barriers at the same time the barriers are deployed and may be adapted to detect strain or cracking in the barriers, leakage of radiation through the barriers, the presence and leaking through the barriers of volatile organic compounds, or similar physical conditions.

46 Claims, 6 Drawing Sheets

SENSOR SYSTEM FOR BURIED WASTE CONTAINMENT SITES

CONTRACTUAL ORIGIN OF THE INVENTION

The United States has rights in this invention pursuant to Contract No. DE-AC07-94ID13223 between the U.S. Department of Energy and Lockheed Martin Idaho Technologies Company.

BACKGROUND OF THE INVENTION

1. Field of the Invention

The present invention relates generally to a sensor system for monitoring the structural integrity of an underground waste containment barrier, and leakage therefrom of waste products or byproducts, and for improved characterization of zones of interest.

2. Background Art

It is often necessary to form a containment barrier around a hazardous waste site to stop or prevent the migration of contaminants into the nearby soil and water tables. The containment barrier must prevent the migration of contaminants both horizontally and vertically away from the waste site. Therefore, a properly constructed containment barrier may be compared to a huge bathtub, with the hazardous waste contained within four side walls and a generally horizontal floor.

A typical, currently-used method of containment is to physically remove the hazardous waste and haul it to a permitted storage facility. However, such method is costly, impractical, and dangerous. Digging up sites with buried drums, radioactive dusts, or other airborne wastes may actually release the contaminants, spreading them into the atmosphere and through the soil.

In response to this problem, a number of suggestions have been made for placing containment barriers around hazardous waste sites, without removing the waste. One approach for doing this is disclosed in International Publication Nos. WO 94/19547 and WO 93/00483 by Halliburton Nus Environmental Corp. The Halliburton system uses a row of high pressure jets to shoot a slurry into soil surrounding a hazardous waste site, somewhat liquefying the surrounding soil. The slurry cuts a path through the soil as it intermixes with the liquified soil. Gravity and/or mechanical means pull the row of high pressure jets through the mix of liquefied soil and slurry, after which the liquefied soil and slurry harden into a protective barrier.

The above-described system has a number of shortcomings, including the possibility of further spreading contaminants by the use of hydraulic jets, the difficulty of maintaining balance between the amount of slurry needed for cutting and the amount of slurry needed for hardening the soil, the difficulty of providing a barrier of consistent strength since it would depend in part upon the soil composition encountered and the amount of slurry deposited, and, finally, the lack of testing of excavated soil to know whether soil surrounding the waste site has become contaminated.

Another suggested approach for installing a containment barrier around a hazardous waste site is disclosed in co-pending patent application Ser. No. 08/925,101, filed Sep. 8, 1997. In this approach, a multi-layer containment barrier is put in place under a hazardous waste site without disturbing any buried waste, in a simple and efficient fashion. The disclosure in the above-noted co-pending patent application is incorporated herein by reference.

In any approach to holding hazardous waste, it would be desirable to monitor the site in terms of both the structural integrity of any containment barrier put in place about the waste material, and leakage of contaminants away from the site. Additionally, it would be desirable to monitor material being excavated from around a waste site in preparation for emplacement of a containment barrier for the site, to determine the extent of contamination of surrounding soils and thus the possible need to extend the containment barrier to a location completely surrounding all contaminated materials and soils. Finally, it would be desirable to efficiently and inexpensively install a long-term monitoring system soon after or simultaneously with the installation of the containment barrier.

OBJECTS AND SUMMARY OF THE INVENTION

It is an object of the invention to provide a sensor system for sensing a variety of physical parameters of a buried waste containment site.

It is also an object of the invention to provide such a sensor system especially suitable for use in connection with a containment barrier disposed under and around a buried waste site.

It is a further object of the invention to provide such a sensor system for monitoring the structural integrity of such a containment barrier.

It is also an object of the invention to provide such a sensor system for sensing leakage of contaminants from a buried waste containment site.

It is still another object of the invention to provide such a sensor system, in accordance with, one aspect thereof, for monitoring soil and material excavated from a buried waste containment site.

It is an additional object of the invention to provide such a sensor system, in accordance with another aspect thereof, for sensing physical parameters of soil being excavated, during the excavation process.

It is, a further object of the invention to provide such a sensor system which may be readily installed at a buried waste containment site simultaneously with the installation of a containment barrier.

It is also an object of the invention to provide such a sensor system in which sensors may be installed and removed after the buried waste containment site is in place.

The above and other objects of the invention are realized in a specific illustrative embodiment of a sensor system for a buried waste containment site having a bottom wall barrier and/or sidewall barriers for containing hazardous waste. The sensor system includes one or more sensor devices disposed in one or more of the barriers for detecting a physical parameter either of the barrier itself or of the physical condition of the surrounding soils and buried waste, and for producing a signal representing the physical parameter detected. Also included is a signal processing device for receiving signals produced by the sensor device and for developing information identifying the physical parameter detected, either for sounding an alarm, displaying a graphic representation of the physical parameter detected on a viewing screen and/or a hard copy printout, etc.

In accordance with one aspect of the invention, the sensor device disposed in one or more of the barriers comprises a strain or crack transducer for detecting strain or cracking and thus possible leakage locations in the barrier in which the transducer is disposed. One embodiment of such a transducer includes a grid of detecting elements disposed in the barriers to detect strains wherever they might occur.

In accordance with another aspect of the invention, one or more access tubes are disposed in or below the barriers with at least one end of the tubes extending from the barriers to allow access thereinto. Sensor devices are then disposed in the access tube or tubes and coupled to the signal processing device through the one end of the tubes. The access tubes provide protection for the sensor device without inhibiting operation thereof. Also, use of access tubes allows for selective removal and deployment of a variety of sensors.

In accordance with still another aspect of the invention, the sensor device is adapted to detect radiation that may be leaking or may have already leaked through the barriers, and/or the presence of RCRA metals. Also, a sensor device may be provided to detect volatile organic compounds using fiber optic spectroscopy deployed in the access tubes.

In another embodiment of the invention, conveyor apparatus is provided for removing and carrying away excavated earthen material. Disposed above the conveyor apparatus and above any material being, carried, by the conveyor apparatus is one or more sensor devices for detecting various conditions and components of the material being carried. The sensor device is coupled to a processing device for developing information identifying the condition or components detected by the sensor device, just as with the sensor device disposed in the containment barriers described above.

In another aspect of the invention, sensor detectable tracers could be used to verify barrier integrity. Specifically, tracers could be placed within the barrier with sensors outside the barrier to determine whether the tracers have migrated through a breach in the barrier, or stayed in place.

In a further aspect of the invention, sensors or sensor arrays are installed in or about a barrier simultaneously with the installation of the barrier. For example the sensors or sensor arrays could be disposed between layers of a multi-layer barrier as the barrier is being installed in a trench dug for that purpose.

As indicated earlier, one approach to installing a containment barrier around a waste site involves the use of high pressure jets shooting a slurry into soil surrounding the waste site. This is also known as grouting, and typically involves a grouting beam or arm which carries the jets and which is moved along a locus to both remove soil and produce the containment barrier with a mixture of slurry and soil. In accordance with an aspect of the present invention, a sensor or sensors are disposed on the grouting arm to detect physical properties of the soil through which the arm moves, to thus determine whether contaminants have leaked from the waste site into the surrounding soil.

BRIEF DESCRIPTION OF THE DRAWINGS

The above and other objects, features and advantages of the invention will become apparent from a consideration of the subsequent detailed description presented in connection with the accompanying drawings in which.

DETAILED DESCRIPTION OF THE INVENTION

Figure 1:
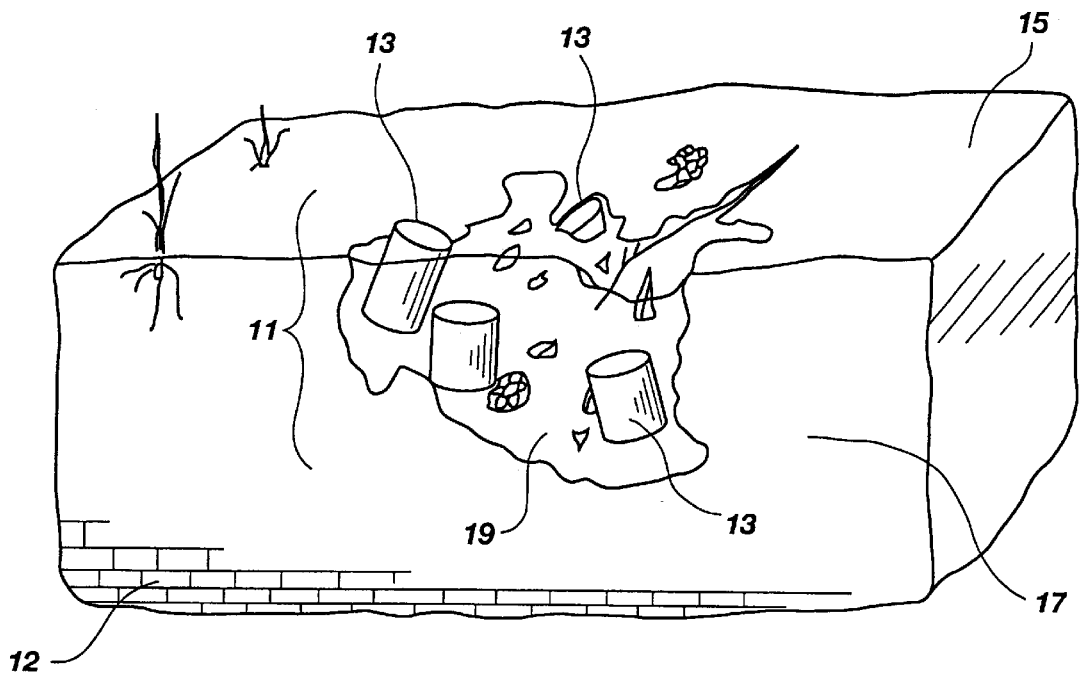
FIG. 1 is a perspective view of a plot of ground contaminated by hazardous waste.

Referring now to FIG. 1, a typical waste site 11 is shown containing drums 13 filled with hazardous waste, both on the surface 15 and buried under the ground 17. Contaminants 19, leaking from the drums 13, threaten to migrate into a water table 12, unless some type of containment barrier can be provided.

Figure 2:
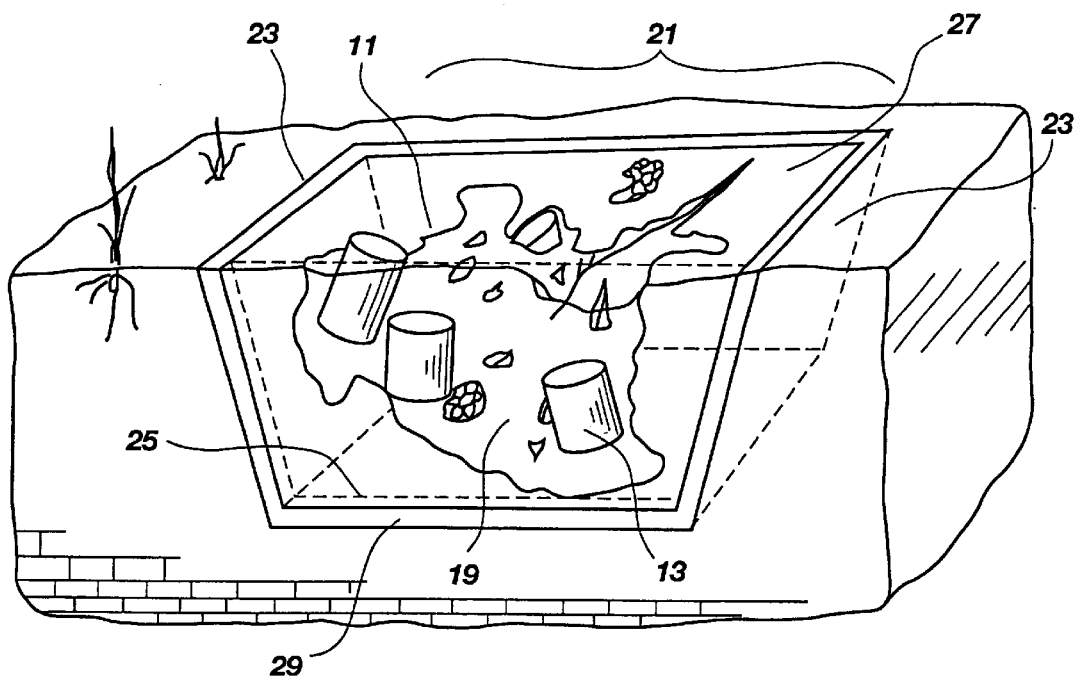
FIG. 2 is a perspective view of the plot of ground with the hazardous waste contained by a protective ground barrier.

One such containment barrier 21 is shown in FIG. 2 to include side barriers or walls 23 and a floor or horizontal barrier 29. The side barriers 23 may be made using conventional methods and interconnected to the horizontal barrier 29. Additionally, the waste site 11 could be completely encapsulated by forming an upper barrier cover (not shown) and if interconnecting it with the side barriers 23 and front and rear barriers 25 and 27 (front barriers 25 are shown in phantom line in FIG. 2). The afore-cited co-pending patent application describes how containment barriers of the type described may be constructed using apparatus such as that to next be briefly described.

Figure 3:
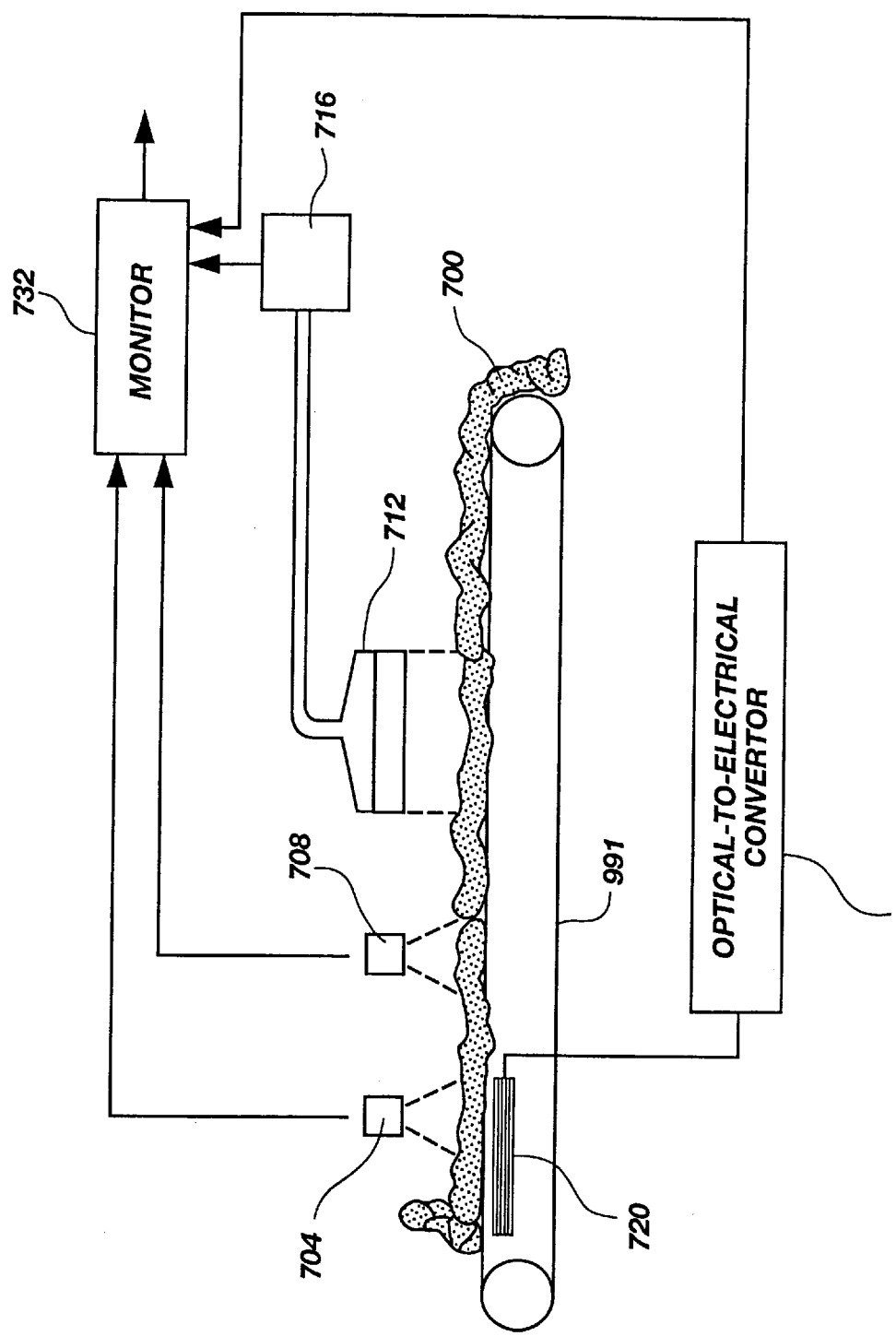
FIG. 3 is a side, schematic view of sensor apparatus positioned above a conveyor carrying excavated material, in accordance with the present invention.

FIG. 3 is a side, schematic view of one embodiment of excavated soil sensor. and assay equipment, in accordance with the present invention.

FIG. 3 shows a conveyor 991 which excavated soil 700 (from a waste containment site) is being carried for ultimate deposit. Disposed above the conveyor 991 for detecting various physical parameters and contaminants of the soil 700 are a gamma ray spectrometer 704, an X-ray fluorescence detector 708, and a hood 712 for collecting vapors rising from the soil 700 and passing the vapors to an analyzer 716. Disposed under (or could be over) the upper section of the conveyor 991 is a scintillating fiber bundle 720 coupled to an optical-to-electrical convertor 728. The gamma ray spectrometer 704, X-ray fluorescence detector 708, analyzer 716 and optical-to-electrical converter 728 are all coupled to a monitor 732 for processing signals received from the various components shown for displaying information represented by the received signals or for taking other action.

The gamma ray spectrometer 704 is provided for making measurements of the energies of particles emitted by different radioactive sources in the soil 700 to thereby distinguish among the sources and identify them. The gamma ray spectrometer 704 supplies signals to the monitor 732 identifying the different sources of radioactivity, and the monitor processes these signals to provide a display, hard copy printout, or other indication to a user of what sources of radioactivity are present in the soil 700. Gamma ray spectrometers are well known in the art.

The X-ray fluorescence detector 708 is provided for detecting the presence of RCRA metals in the soil 700. The detector 708 supplies signals to the monitor 732 indicating whether or not RCRA metals have been detected, and the monitor then develops a suitable display, printout, etc. This type of detection is well known.

The hood 712 collects whatever vapors may be emitted by the soil 700, but in particular volatile organic compounds, and these are supplied to the analyzer 716. The analyzer 716 could include a variety of devices for detecting the presence of volatile organic compounds including an acousto-optic tunable filter (AOTF) infrared spectrometer or a Fourier-transform infrared spectrometer. Either of these devices is suitable for detecting the presence of volatile organic compounds and both are well known in the prior art. If volatile organic compounds are detected by the analyzer 716, the analyzer supplies signals to the monitor 732 identifying the volatile organic compounds and this information may then be displayed, provided on a hard copy printout, etc.

The scintillating fiber bundle 720 is provided to detect the presence of radiation emanating from the soil 700 being conveyed on the Conveyor 991. The fiber bundle 720, in the presence of different types of radiation, emits light of a characteristic frequency, and this light is then supplied to the optical-to-electrical converter 728. There, the light is converted to electrical signals for supply to the monitor 732, for producing a display or other indication of the nature of the radiation it detected.

Scintillating fiber bundles illustratively may be made of polystyrene fibers, doped with fluorescent compounds that scintillate in response to various kinds of ionizing radiation. This radiation-induced scintillation comprises the light supplied to the optical-to-electrical converter 728 for conversion to electrical signals. Scintillating fiber bundles are commercially available.

The monitor 732 might, advantageously, be a conventional computer-based data acquisition and display system, such as a Dell PC with Pentium processor.

Figure 4:
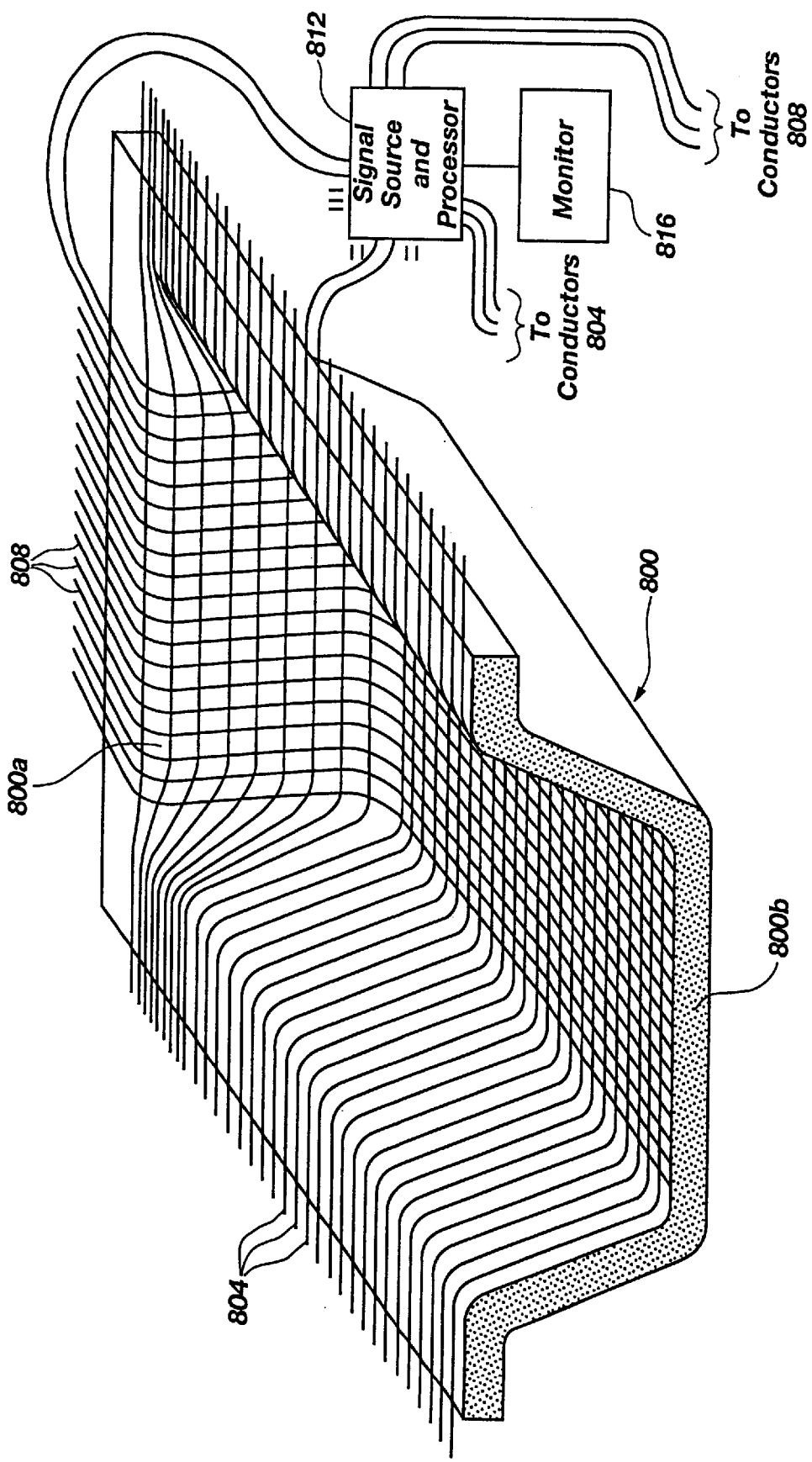
FIG. 4 is a perspective view of a grid sensor system deployed in a containment barrier, in accordance with the present invention.

The sensing and assaying discussed above is for soil excavated as a result of installing a waste containment barrier, for example in accordance with the method described in the afore-cited co-pending patent application. It is also desirable to monitor the barrier itself for integrity and to determine whether leakage of contaminated material through the barrier is taking place. FIG. 4 is a perspective view of a grid sensor system for monitoring the integrity of a waste containment barrier 800. In one embodiment, the grid sensor system includes a first plurality of conductors 804 extending generally in parallel in one direction through the barrier 800, and a second plurality of conductors 808 extending also generally in parallel in another direction in the barrier to intersect with the first plurality of conductors at an end wall 800a and a bottom wall 800b (and the other end wall not shown) of the barrier 800. Both ends of the first plurality of conductors 804 and of the second plurality of conductors 808 are gathered and routed to a signal source and processor 812. The signal source and processor 812 supplies electrical signals to both sets of conductors 804 and 808, which have a predetermined characteristic impedance. The electrical signals supplied to one end of the sets of conductors will then be received by the signal source and processor 812 from the other end. Any strain, i.e., change in dimension, which takes place in the material of the barrier 800, for example, such as the development of cracks or openings, will affect the conductors 804 and 808. The affect will be generally to elongate the conductors where the strain occurs and this will result in a change in the characteristic impedance of the affected; conductors. If a strain, for example, occurs near an intersection of one of the conductors 804 and one of the conductors 808, then the characteristic impedance of those two conductors could be read by the signal source and processor 812 and that would locate the location of the strain as being near the intersection. The change in characteristic impedance can be measured with electrical time domain reflectometry, a well-known measuring technique. Once the location or locations of strain are detected by the signal source and processor 812 (e.g., spectrum analyzer), it signals a monitor 816 which develops an output identifying the location of the strain. The monitor 816 might advantageously be a computer-based data acquisition system, as with the monitor 732 in FIG. 3.

An alternative embodiment to the conductor grid described above for determining integrity of the barrier 800, is a grid of fiber optic strands disposed in the barrier 800 in the same manner as are the conductors. Assume that the conductors 804 and 808 are simply replaced with fiber optic strands (as shown in a side view in FIG. 5) and that the signal source and processor 812 provides light of a certain intensity and wavelength to one end of strands 804 and 808 and then that the signal source and processor receives from the corresponding opposite ends the light that has been transmitted through the strands. If a change in wavelength and/or intensity of the light in any of the strands is detected by the signal source and processor 812, such change indicates that strain or cracking has occurred in the barrier 800 at a location near the affected strands. Thus, detecting a change in the wavelength and/or intensity of light in two or more intersecting strands would indicate that the strain or cracking has occurred near that intersection and this information could be supplied by the signal source and processor 812 to the monitor 816 for display or other disposition. For processing the received light, the signal source and processor 812 might illustratively be a commercially available optic time domain reflectometer, or optical spectrum analyzer, interfaced to a personal computer.

The spacing between conductors 804 and 808 or between fiber optic strands 804 or 808 could illustratively be about one foot. This would enable identification of the location of strain or cracks in the barrier 100 to resolution of about six inches.

Although a grid of either conductors or fiber optic strands were shown and described for FIG. 4, it is also possible to detect the location of a strain or crack occurring in a barrier by an array of wires or fiber optic strands. extending parallel to one another and just in one direction. In particular, a strain or crack which affects a single wire can be located using electrical time domain reflectometry in which a wavelength shift in a signal applied to the wire indicates a strain or cracking in the barrier, as analyzed by a spectrum analyzer. Electrical time domain reflectometry is a well-known operation. Similarly, the location of a crack or strain affecting a fiber optic strand could be determined by measuring a back-reflected signal (reflected from the crack or strain in the fiber) of an optical pulse sent down the fiber, using optical time domain reflectometry.

Figure 5:
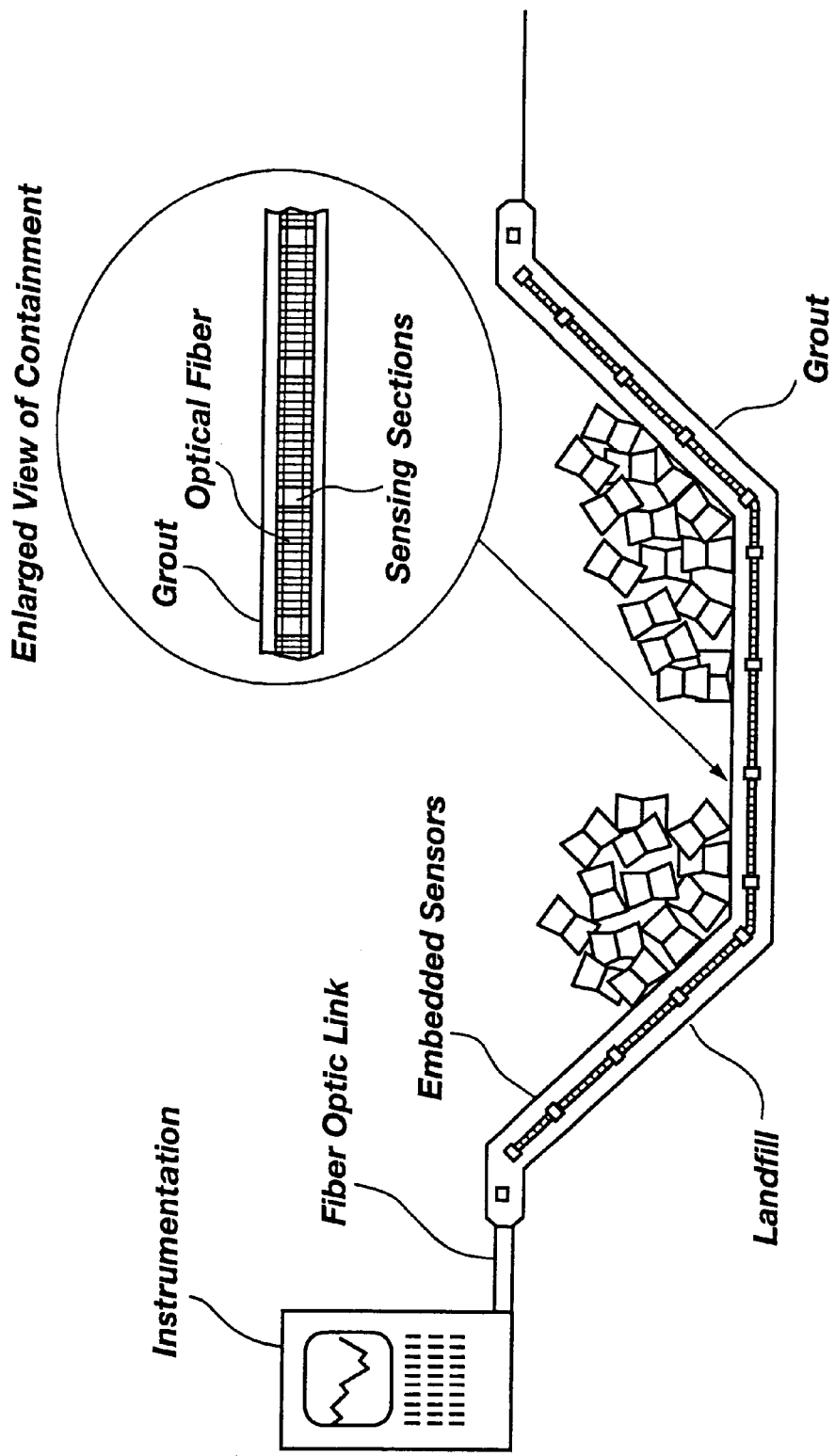
FIG. 5 is a side, schematic view of a fiber optic strain/crack sensor system deployed in a containment barrier, in accordance with the present invention;.

FIG. 5 shows another embodiment of a fiber optic strain/crack sensor system embedded in a containment barrier made of grout.

Figure 6:
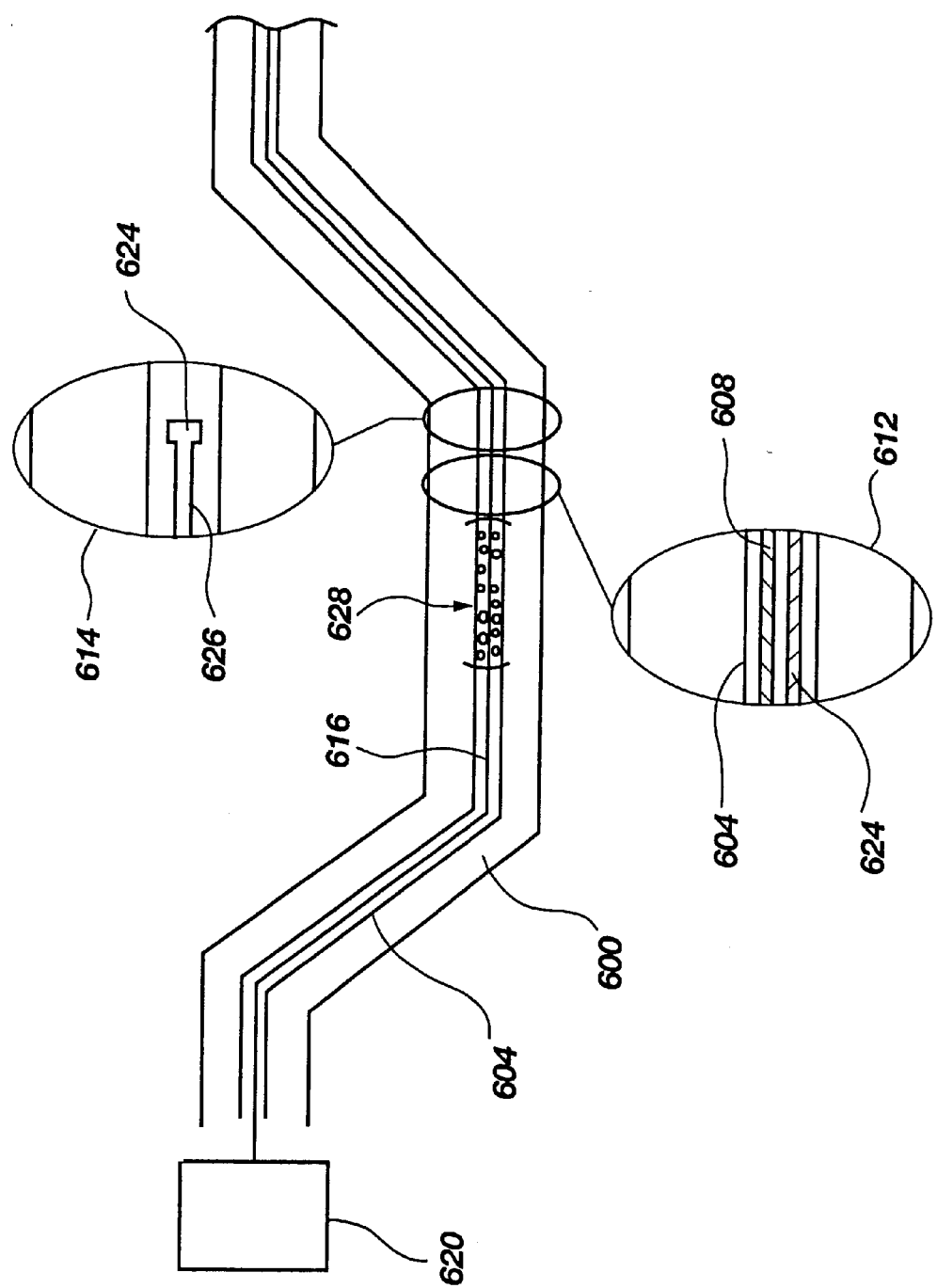
FIG. 6 is a schematic view of a gamma spectroscopy sensor system suitable for use in the present invention.

FIG. 6 shows a side schematic view of another embodiment of the present invention in which hollow access tubes 604 are disposed in a containment barrier 600, with the tubes being placed into the barrier (or below) during emplacement of the barrier. The access tubes 604 are used to deploy, among others, radiation sensors, such as scintillating fiber bundles or thermoluminescent dosimeters, X-ray fluorescence sensors for detecting the presence of RCRA metals, and/or a fiber-optic spectroscopy system to detect volatile organic compounds. The access tubes 604 could be emplaced in the barrier 600 using a variety of known deployment methods. The access tubes 604 may be placed in the bottom wall of the barrier and/or the sidewalls thereof.

FIG. 6 shows a specific embodiment of a sensor system carried in the access tube 604 to include scintillating fiber bundles 608 (best seen in the enlarged view 612 of a section of the barrier 600 and tube 604). The scintillating fiber bundles 608 were discussed earlier in connection with FIG. 3, and operate to emit light of different frequencies depending upon the type of radiation to which the fiber bundles are exposed. Fiber optic strands 616 are carried by the access tube 604 and coupled to the scintillating fiber bundles so that light emitted by the fiber bundles it when exposed to radiation is carried by the fiber optic strands to a monitor 620. The monitor 620 would include an optical-to-electrical convertor for converting the light to electrical signals for processing by a signal processing circuit to develop information identifying the type of radiation detected which information could then be provided to a user.

X-ray fluorescence sensors could also be deployed in the access tube 604, for detecting the migration of RCRA metals through the barrier 600, in a manner similar to that discussed in connection with FIG. 3. Conductors would be coupled to the X-ray fluorescence sensors for carrying signals to the monitor 620 for processing and display of information relating to the presence of RCRA metals.

Fiber-coupled optical systems based upon Raman and/or fluorescence spectrbscopies could also be deployed in access tubes in or around the barrier to detect and identify volatiles permeating through the containment barrier and through perforations 628 in the tube 604. Such systems operate by transmitting an excitation signal from a laser to a sample volume at the distal end of an optical fiber, or fiber bundle, and then sampling and analyzing the excited gas in the volume with a second fiber. This signal is then returned to a spectrometer and analyzed to determine the type and concentration of volatiles present. The systems can be multiplexed to obtain samples from multiple locations beneath the barrier. Using available microchip laser technology, the laser itself can be fiber-optically coupled and placed in the access tubes. A fiber optic spectroscopy sensor 624 at the distal end of a fiber 626 is shown in the enlarged views 612 and 614 of the access tube 604.

Two other types of sensor systems could utilize the tube 604 of FIG. 6 including acoustic sensors and radar sensor systems. Acoustic sensors could be used to determine barrier emplacement performance and to gather information about waste pit contents. Typically, arrays of acoustic transmitters would be disposed in tubes extending through the bottom wall containment barrier, for transmitting acoustic signals upwardly through the waste pit contents. Arrays of acoustic receivers are deployed on the surface or just under the surface at the top of the waste pit for receiving transmitted acoustic signals. The acoustic receivers in effect measure the propagation of various seismic waves, such as pressure waves, shear waves, raleigh waves, etc. (through the waste pit contents), such propagation depending upon the elastic properties of the contents. The arrays of transmitters and arrays of receivers are coupled via control cables to signal source and processor equipment and monitors for processing the acoustic signals and displaying information determined from the sensors, in a manner similar to the systems discussed earlier.

A radar system could also be used to map barrier performance. With such a system, transmitters could be deployed in the tubes extending in the bottom wall of a barrier containment system to transmit electromagnetic waves upwardly through the waste pit contents to electromagnetic wave receivers deployed on or near the surface of the waste pit. Heterogeneities in the waste pit contents (e.g., different soils, objects, moisture content, etc.) have different electromagnetic properties, transmitting electromagnetic waves through the waste contents. and then receiving and mapping the transmitted signals will provide data about the contents and the performance of the waste containment barrier in containing the contents. Of course, the transmitter arrays and receiver arrays would be coupled by cables (or telemetry devices) to signal source and processor equipment and monitors for displaying the data derived from the transmission and reception of electromagnetic waves through the waste pit contents.

Although the acoustic sensor system and radar system described above were defined as transmitting signals from the bottom of the waste pit up to the surface thereof, it is obvious that the transmitters could be arranged on one side of the waste pit, with receivers arranged on the opposite side and that the signals could be transmitted effectively horizontally through the waste pit contents. In this case, the transmitters would be deployed in access tubes located on one side of the waste pit, with receivers deployed in access tubes located on the other side of the waste pit.

A resistivity system might also be deployed in the tubes for measuring long-term barrier performance. Such a system utilizes very low frequency electromagnetic fields (approaching the direct-current limit) to perform direct current resistivity measurements of the barrier contents. An electromagnetic wave transmitter would be deployed in a tube near the center of the waste pit at the bottom thereof, to transmit 360 degrees outwardly, with receivers being located outside of the waste pit, either underground or on the surface for receiving the transmitted waves. The resistivity measurements would provide an indication of barrier integrity such as imperfections, cracks and breaks.

With the arrangement of access tubes described in particular with respect to FIG. 6, it is apparent that various sensors could be deployed it in the access tubes simultaneously or one type sensor might be deployed for data gathering at one point in time, then removed and another type sensor deployed in the access tubes for acquisition of different data. Since one or both ends of the access tubes would extend through the surface of the ground, sensor arrays could easily be installed and later removed from the access tubes to make way for a different sensor array.

Advantageously, the access tubes 604 could be made of any flexible, electrically neutral material, and may be perforated, as shown at 628 in FIG. 6, to allow entry of VOC's for detection purposes. The access tubes 604 could illustratively have an inside diameter of from 0.5 to 6 inches. The spacing of the access tubes, advantageously, is about three feet.

Another approach to monitoring barrier integrity involves the use of a tracer system in which tracers are placed at various locations in the barrier. The tracers could be dye, detectable by fluorescence spectroscopy, visual or chemical testing of samples of soil or groundwater, or ferromagnetic material, detectable by magnetic sensors.

The sensors would be placed outside the barrier in positions to detect movement of the tracers and thus a possible breach in the integrity of the barrier.

Figure 7:
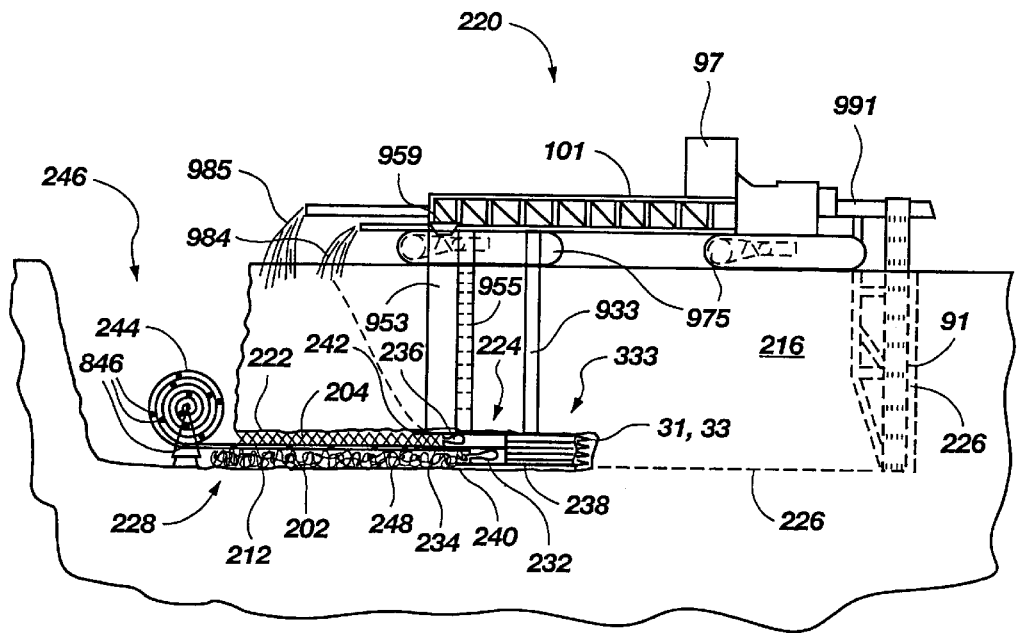
FIG. 7 is a side view of a barrier placement machine suitable for constructing a multi-layer underground barrier and for simultaneously deploying sensor devices in the barrier.

Referring now to FIG. 7, there is shown an embodiment of a barrier placement machine 220. The barrier placement machine 220 includes an operator's cab 97, a cutting chain and grout injector assembly 333 including cutter teeth 31 and discharge paddles 33, a grout receiving conveyor 959, a soil retaining shield traveling pan 953, a soil retaining shield consolidator 955, a side trench excavator 91, soil conveyor 933, and track mechanism 975 for moving the entire machine 220. The machine 220 is depicted in FIG. 7 in schematic form, and may include all other components necessary for its operation, as understood by those of ordinary skill in the relevant field.

As the barrier placement machine 220 moves forward, a trench excavator 91 digs a side trench shown in phantom line at 226. The trench excavator 91 carries the excavated soil 984 up out of the ground and dumps it on the trench excavator conveyor 991, which carries the soil backwardly along the machine 220. Grout or other suitable barrier forming material is then placed within the side trench 226 by the soil retaining shield traveling pan 953 and the soil retaining shield consolidator 955, along with any other necessary grout injecting devices known to those of ordinary skill, to form the side barrier. The trench excavator conveyor 991 dumps the soil 984 behind the barrier placement machine 220, refilling the side trench 226. Simultaneously, the cutting chain and grout injector assembly 333 and soil conveyor 933 operate to excavate earthen material 985 from beneath the in-situ portion of earth 216 without removing said in-situ portion, and discharges the soil 985 above ground as shown in FIG. 7 where it lies conveniently accessible for testing if desired.

The machine 220 further includes a barrier-forming means 953, 955 and 224 attached to the excavating means 31, 33 and 91 for simultaneously forming a side barrier and a generally horizontal, multi-layer barrier 228 (or could be a single-layer) within the generally horizontal trench 222, said multi-layer barrier 228 having at least a first layer 202 and a second layer 204. This is further described in the afore-cited co-pending application.

Regarding the horizontal, multi-layer barrier 228, a horizontal barrier forming mechanism 224 is provided for forming at least a portion of the second layer 204 simultaneously with forming at least a portion of the first layer 202. More specifically, the horizontal barrier forming mechanism 224 includes: a first injector 232 for injecting a first material for forming the first layer 202 in the horizontal trench 222; a mechanism for placing an intermediate shield 234 over the material for the first layer 202; a second injector 236 for injecting a second material for forming the second layer 204 onto the intermediate shield 234; and a frame 238 to which the intermediate shield 234 is attached for removing the intermediate shield 234 from between the first and second material forming the first and second layers 202 and 204. The intermediate injectors 232 and 236 and, as an extension of the frame 238, is advanced horizontally between the first and second layers 202 and 204 as they are formed, as the track mechanism 975 advances the machine 220.

The first and second injectors 232 and 236 are contained within first and second chambers 240 and 242, respectively. The intermediate shield 234 thus operates as a carrying member coupled to the chambers 240 and 242. The third, middle layer 212 begins a dispensable, pre-formed roll 244 of barrier material that resides in a suitably sized trench 246. The roll 244 of barrier material includes a first end 248. Any suitable attaching means known to those of ordinary skill in the art may be used for attaching the first end 248 of the roll 244 of barrier material to the intermediate shield 234, such that barrier material is withdrawn from the dispensable roll 244 as the machine 220 advances. In such manner the roll of material 244, which might comprise a high performance material such as polyethylene or any suitable geo-textile membrane material, is pulled between the first and second layers 202 and 204 as the machine 220 advances. In this embodiment, the barrier material of the roll 244 preferably has sufficient strength to be pulled between the first and second layers 202 and 204 without substantial tearing.

Figure 8:
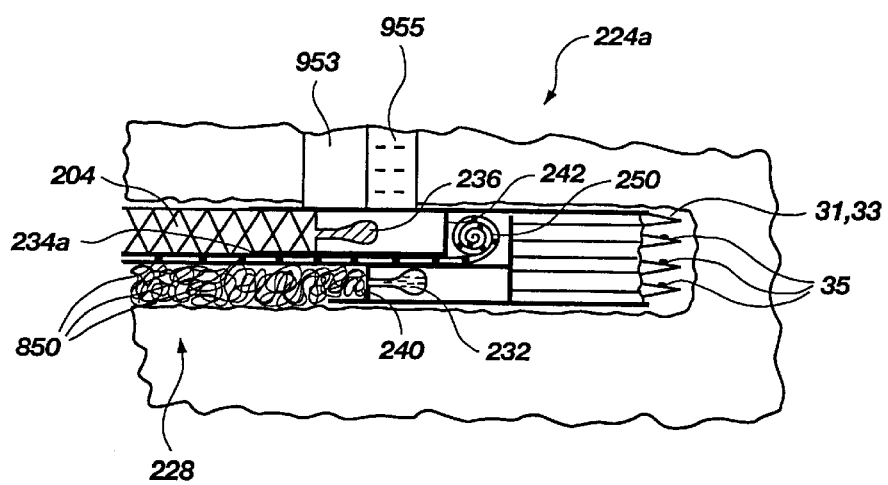
FIG. 8 is a side, cross-sectional view, enlarged, of the multi-layer underground barrier of FIG. 7.

FIG. 8 depicts another embodiment of a barrier placement approach in which a dispenser 250 comprises a pre-formed roll of barrier material rotatably disposed between horizontal digging elements 31, 33 and the chambers 240, 242. The second injector 236 is positioned to inject the second layer 204 on top of an intermediate shield 234a such that said shield 34 separates the second layer 204 and the pre-formed layer 212 as said second layer 204 and said pre-formed layer 212 are being respectively injected and dispensed. The intermediate shield 34a thereby operates as a retaining plate.

Various sensors 846 (FIG. 7) and 850 (FIG. 8), of the types described, may be disposed on the barrier material (geo-textile membrane) of the rolls 244 and 250, respectively, for sensing barrier integrity, radiation, etc. In this manner, any desired sensor can be deployed between the first and second layers 202 and 204 by being incorporated into the membrane barrier material forming the roll 244 or the roll 250. In other words, the sensors 846 or 850 can be installed at the same time as the barrier 228 is installed.

Referring again to FIG. 8, sensors 35 may be installed in the as volatile organic compounds (VOCs), heavy metals and radiation, to determine if contamination has leaked from the waste site. The sensors 35 might illustratively be comprised of scintillating fiber optic bundles, x-ray fluorescence sensors, or fiber-coupled optical systems, for transmitting signals to a receiver located, for example, on the surface to indicate the soil characteristics being detected.

In a manner similar to sensors 35 on the cutting teeth 31, sensors could be mounted on a grouting beam or arm, such as those disclosed in the foresighted International Publication Numbers WO 94/19547 & WO 93/00483 by Halliburton Nus Environmental Corp., for detecting soil characteristics of soil through which the grouting beam is moved to form the containment barrier.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

We claim:

1. A sensor system for a buried waste containment site having a bottom wall grout barrier and sidewall grout barriers, for containing waste, said sensor system comprising one or more sensor means removably deployed within one or more access tubes encased within one or more of said grout barriers for detecting a physical phenomenon and for producing a signal representing the physical phenomenon detected, and monitor means coupled to the sensor means for receiving said signal and developing information identifying the physical phenomenon detected.

2. A sensor system as in claim 1 wherein said sensor means comprises strain/crack transducer means for detecting strain/cracking in the barrier in which it is disposed.

3. A sensor system as in claim 2 wherein said strain/crack transducer means comprises electrical conductors disposed in the barriers and having a characteristic impedance, means for developing the characteristic impedance in the conductors, and means for detecting a change in the impedance to thereby determine the strain.

4. A sensor system as in claim 3 wherein said electrical conductors are arranged in a grid.

5. A sensor system as in claim 2 wherein said strain/crack transducer means comprises fiber optic strands disposed in the barriers, means for transmitting light through the strands, with the light having a predetermined intensity and wavelength, and means for receiving light transmitted through the strands and for detecting a change in one or both the intensity and wavelength of the light to thereby determine the strain/cracking.

6. A sensor system as in claim 5 wherein said fiber optic strands are arrayed in a grid.

7. A sensor system as in claim 5 wherein said light transmitting means comprises means for transmitting light through selected strands, and wherein said receiving and detecting means comprises means for determining when the intensity of light changes in a strand or strands and where along the length of the strand or strands the change occurs so as to identify the location of a strain/crack.

8. A sensor system as in claim 5 wherein said light transmitting means comprises means for transmitting light through selected strands, and wherein said receiving and detecting means comprises means for determining when the wavelength of light changes in a strand or strands and where along the length of the strand or strands the change occurs so as to identify the location of a strain/crack.

9. A sensor system as in claim 4 or 6 wherein the grid spacing is about one foot between elements.

10. A sensor system as in claim 1 wherein said one or more access tubes are selectively disposed in said one or more of said barriers so that at least one end of such tubes extend from the barriers, and wherein said one or more sensors are disposed in said one or more access tubes and coupled to the monitor means through said one end of such tubes.

11. A sensor system as in claim 10 wherein said sensor means comprises means for detecting radiation.

12. A sensor system as in claim 11 wherein said radiation detecting means comprises scintillating fiber bundles disposed in the access tubes for producing light whose frequency is dependent upon the type of radiation present, and optical means for transmitting light from said scintillating fiber bundles to said monitor means, and wherein said monitor means comprises signal detection means for detecting the frequency of light received from the scintillating fiber bundles to thereby determine the presence of radiation.

13. A sensor system as in claim 12 wherein said signal detection means comprises optical-to-electrical signal transducer means for producing electrical signals from light received from the scintillating fiber bundles, and processor means for processing the electrical signals to determine the presence of radiation.

14. A sensor system as in claim 10 wherein said sensor system comprises means for detecting volatile organic compounds (VOC's).

15. A sensor system as in claim 14 wherein said VOC detecting means comprises a fiber-optic spectroscopy sensor disposed in the access tubes for detecting VOC's entering the tubes, and wherein the access tubes include perforations through which VOC's may enter the access tubes.

16. A sensor system as in claim 10 wherein the interior diameter of said access tubes are about 0.5 to 6 inches, and wherein said access tubes extend generally in the same direction and are spaced apart about three feet.

17. A sensor system as in claim 1 wherein said sensor means comprises an acoustic sensor for detecting physical properties of waste contained within the barriers.

18. A sensor system as in claim 17 wherein said acoustic sensor comprises means for transmitting an acoustic wave through the waste, means for receiving an acoustic wave transmitted through the waste, and means for processing received acoustic waves to determine physical properties of the waste through which the acoustic wave was transmitted.

19. A sensor system as in claim 1 wherein said sensor means comprises electromagnetic wave transmitting means for applying an electromagnetic wave to one or more of said barriers and the ground therebelow, antenna means for receiving electromagnetic waves applied to the one or more barriers and ground, and means for processing received electromagnetic waves to determine electrical properties of the one or more barriers and ground.

20. A sensor system as in claim 1 wherein said sensor means comprises means for applying low frequency electromagnetic fields to one or more of said barriers, means for detecting electromagnetic fields in the one or more of said barriers, and means for processing the detecting electromagnetic fields to determine resistivity changes in the one or more of said barriers, indicating an imperfection or breach in the barriers.

21. A sensor system as in claim 1 wherein said sensor means are configured to detect a physical phenomenon about the waste contained within the barriers.

22. A sensor system as in claim 21 wherein some of said sensor means are disposed in the bottom wall barrier, and other of said sensor means are disposed at or near the surface of the waste contained within the barriers, for detecting a physical phenomenon of the waste located between said some of said sensors and said other of said sensor means.

23. A sensor system as in claim 21 wherein some of said sensor means are disposed in a first sidewall barrier and other of said sensor means are disposed in a second sidewall barrier positioned opposite the first sidewall barrier, for detecting a physical phenomenon of the waste located between said some of said sensor means and said other of said sensor means.

24. A sensor system as in claim 1 further including a geo-textile membrane disposed on/in one or more of said barriers, and further comprising additional sensor means disposed in the membrane.

25. A sensor system as in claim 1, wherein at least one of said bottom wall grout barrier and sidewall grout barriers comprise an injected grout barrier formed in-situ.

26. A sensor system as in claim 1, wherein at least one of said bottom wall grout barrier and sidewall grout barriers comprise a multi-layer barrier.

27. A sensor system for a buried waste containment site having at least one grout barrier for containing waste, said sensor system comprising:
  one or more access tubes disposed within said at least one grout barrier, such that a sensor may be deployed within said one or more access tubes, such that said sensor is encased within said at least one grout barrier;
  at least a first sensor deployed in said one or more access tubes, said at least first sensor configured to detect a first physical phenomenon and produce a first signal representing the physical phenomenon detected, and
  a processing system in communication with said at least first sensor, said processing system configured to receive and process said first signal representing the first physical phenomenon detected.

28. The sensor system of claim 27, wherein said at least first sensor may be replaceably removed from said one or more access tubes.

29. The sensor system of claim 27, wherein said one or more access tubes extend through at least one surface of said grout barrier.

30. The sensor system of claim 29, wherein said one or more access tubes extend through a ground surface adjacent said buried waste containment site.

31. The sensor system of claim 29, wherein said one or more access tubes comprise a parallel series of tubes.

32. The sensor system of claim 31, wherein said one or more access tubes form a grid array through said at least one grout barrier.

33. The sensor system of claim 31, wherein said one or more access tubes are separated by a space of about one foot.

34. The sensor system of claim 31, wherein said one or more access tubes are separated by a space of about three feet.

35. The sensor system of claim 27, wherein said access tubes have generally circular cross section with an interior diameter of from about 0.5 to about 6 inches.

36. The sensor system of claim 27, wherein said one or more access tubes comprise walls formed of an electrically neutral material in said grout barrier.

37. The sensor system of claim 36, wherein said walls are perforated.

38. The sensor system of claim 36, wherein said electrically neutral material is flexible.

39. The sensor system of claim 27, wherein said at least first sensor is selected from the group consisting of an electrical impedance strain transducer, a fiber optic strain transducer, a radiation detector, a volatile organic compounds (VOC's) detector, an acoustic sensor, an electromagnetic wave transmitter, and an electromagnetic wave receiver.

40. The sensor system of claim 27, further comprising at least a second sensor deployed in said one or more access tubes, said at least second sensor configured to detect a second physical phenomenon and produce a second signal representing the second physical phenomenon detected.

41. The sensor system of claim 40, wherein said at least second sensor is in communication with said processing system and said processing system is configured to receive and process said second signal.

42. The sensor system of claim 40, wherein said at least second sensor may be replaceably removed from said one or more access tubes.

43. The sensor system of claim 40, wherein said at least second sensor is selected from the group consisting of an electrical impedance strain transducer, a fiber optic strain transducer, a radiation detector, a volatile organic compounds (VOC's) detector, an acoustic sensor, an electromagnetic wave transmitter, and an electromagnetic wave receiver.

44. The sensor system of claim 27, further comprising at least a second sensor directly encased in said grout barrier, said at least second sensor configured to detect a second physical phenomenon and produce a second signal representing the second physical phenomenon detected.

45. The sensor system of claim 44, wherein said at least second sensor is in communication with said processing system and said processing system is configured to receive and process said second signal.

46. The sensor system of claim 44, wherein said at least second sensor is selected from the group consisting of an electrical impedance strain transducer and a fiber optic strain transducer.

* * * * *